United States Patent
Herdendorf et al.

(10) Patent No.: US 11,783,858 B2
(45) Date of Patent: Oct. 10, 2023

(54) SHAPE MEMORY ALLOY BASED ACTUATOR LATCH

(71) Applicant: Seagate Technology LLC, Fremont, CA (US)

(72) Inventors: Brett R. Herdendorf, Mound, MN (US); Riyan Alex Mendonsa, Minneapolis, MN (US); Krishnan Subramanian, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 17 days.

(21) Appl. No.: 17/569,422

(22) Filed: Jan. 5, 2022

(65) Prior Publication Data
US 2022/0213876 A1    Jul. 7, 2022

Related U.S. Application Data

(60) Provisional application No. 63/134,480, filed on Jan. 6, 2021.

(51) Int. Cl.
| | |
|---|---|
| *G11B 21/22* | (2006.01) |
| *G11B 5/54* | (2006.01) |
| *F03G 7/06* | (2006.01) |
| *G11B 5/48* | (2006.01) |
| *G11B 5/55* | (2006.01) |

(52) U.S. Cl.
CPC .............. *G11B 21/22* (2013.01); *F03G 7/064* (2021.08); *F03G 7/06143* (2021.08); *G11B 5/54* (2013.01); *G11B 5/4873* (2013.01); *G11B 5/5573* (2013.01)

(58) Field of Classification Search
None
See application file for complete search history.

(56) References Cited

U.S. PATENT DOCUMENTS

| | | | | |
|---|---|---|---|---|
| 5,019,932 | A * | 5/1991 | Iwata | G11B 5/54 360/256.3 |
| 5,463,514 | A * | 10/1995 | Yaeger | G11B 5/54 360/254.3 |
| 7,315,436 | B1* | 1/2008 | Sanchez | G11B 5/4873 360/294 |
| 2003/0179502 | A1* | 9/2003 | Kim | G11B 5/54 360/254.3 |
| 2004/0141256 | A1* | 7/2004 | Hong et al. | G11B 5/54 360/256 |
| 2018/0066636 | A1 | 3/2018 | Khoshkava et al. | |
| 2019/0121120 | A1 | 4/2019 | Schiepp et al. | |
| 2019/0242370 | A1 | 8/2019 | Foshansky et al. | |
| 2020/0378521 | A1 | 12/2020 | Dörfler | |

* cited by examiner

*Primary Examiner* — Craig A. Renner
(74) *Attorney, Agent, or Firm* — HOLZER PATEL DRENNAN

(57) ABSTRACT

A device disclosed herein includes an upper shape memory alloy (SMA) wire, a lower SMA wire, a flexure having an opening, and a spring configured within the flexure opening, wherein the lower SMA wire, and the flexure are attached at one end to an anchor and at another end to a pin.

20 Claims, 6 Drawing Sheets

SHAPE MEMORY ALLOY BASED ACTUATOR LATCH

CROSS-REFERENCE TO RELATED APPLICATIONS

This application is a non-provisional application based on and claims priority to U.S. Provisional Application Ser. No. 63/134,480 entitled "SHAPE MEMORY ALLOY BASED ACTUATOR LATCH" filed on Jan. 6, 2021, which is incorporated herein by reference in its entirety.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

A device disclosed herein includes an upper shape memory alloy (SMA) wire, a lower SMA wire, a flexure having an opening, and a spring configured within the flexure opening, wherein the lower SMA wire, and the flexure are attached at one end to an anchor and at another end to a pin.

An actuator latch disclosed herein includes a flexure configured between an upper shape memory alloy (SMA) wire and a lower SMA wire, wherein each of the upper SMA wire and the lower SMA wire are attached at one end to an anchor and at another end to a pin wherein the flexure has an opening configured to house a spring.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Currently most hard drive actuators are latched in their off-disk position by a magnetic bias pin. But new types of actuator drives may not allow such a configuration, or they may need more force than a magnetic bias pin can produce. There is a need for a low cost, clean mechanical latch for future actuators.

One or more implementations of actuator latches disclosed herein use materials and flexure that switches between multiple stable positions. For example, in a specific implementation, the actuator latch is configured using a bistable material that allows the flexure to switch between two positions. One or more implementations of such flexures for the actuators may be made from shape memory alloys (SMAs).

Example of such SMAs include, nickel-titanium (Ni—Ti), Copper-Aluminum-Nickel, etc. Other SMAs that have the capability to remember their shape and are able to return to their shape even after being bent may be used. Specific SMAs that can be used to implement the flexures disclosed herein may be plastically deformed at low temperature and recover the plastic strain by increasing their temperature.

Figure 1:
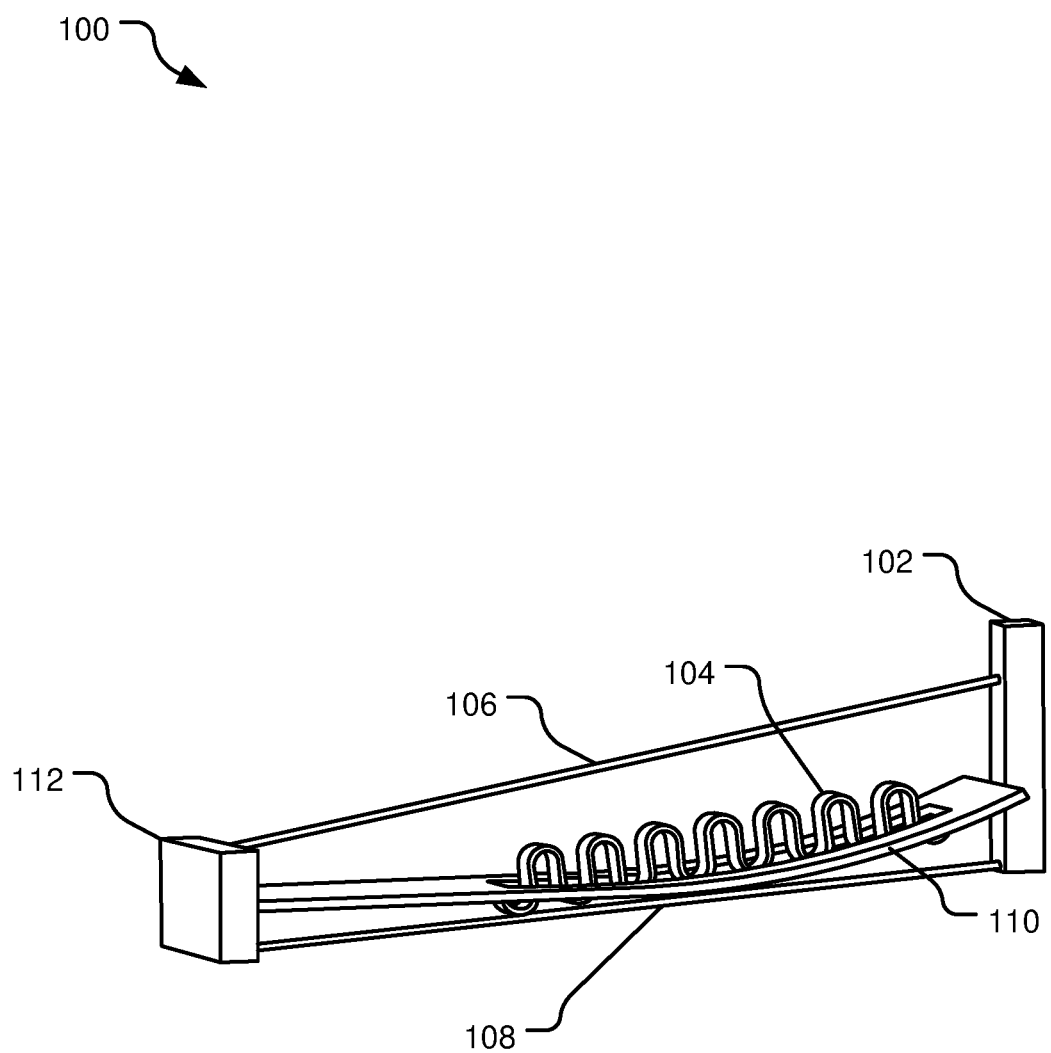
FIG. 1 illustrates an example diagram of an actuator latch configured from shape memory alloy.

FIG. 1 illustrates an example diagram of an actuator latch 100 configured from shape memory alloy. As illustrated in FIG. 1, the actuator latch 100 is configured between an a stop or a pin 102 and an anchor 112. The pin 102 may be attached to an actuator (not shown). The actuator latch includes a spring 104, an upper SMA wire 106, a lower SMA wire 108, and a flexure 110. The flexure 110 may have an opening wherein the spring 104 is located. The spring 104 may be made of stainless steel. The stop or pin 102 may be made of rubber or other material that has similar viscoelastic, damping and other properties conducive with operations (in a drive). The flexure 110 may also be made of a bistable or SMA material such as Ni—Ti alloy. An Ni—Ti alloy (also known as Nitinol) is an alloy with a near-equiatomic composition (i.e., 49%-51%) of nickel and titanium. Ni—Ti belongs to the class of shape memory alloys that can be deformed at a low temperature and are able to recover their original, permanent shape when exposed to a high temperature.

The actuator latch 100 may be designed to pre-load the actuator.

Figure 2:
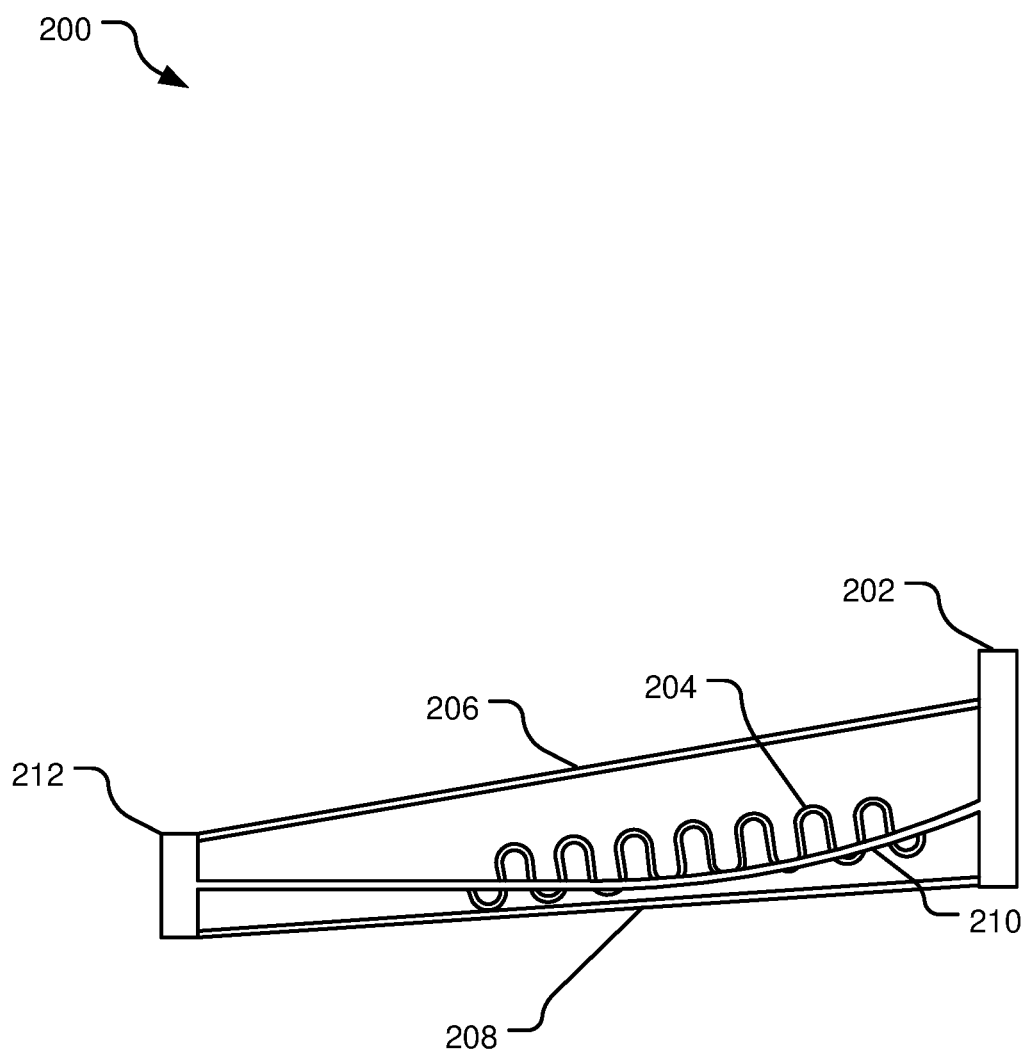
FIG. 2 illustrates an example diagram of an actuator latch in an up position.

FIG. 2 illustrates an example side view of an actuator latch 200 in an up position. Actuator latch 200 includes pin 202, a spring 204, an upper SMA wire 206, a lower SMA wire 208, a flexure 210, and an anchor 212. One or more of the components 202-212 are substantially similar to the components 102-112 disclosed in FIG. 1.

Figure 3:
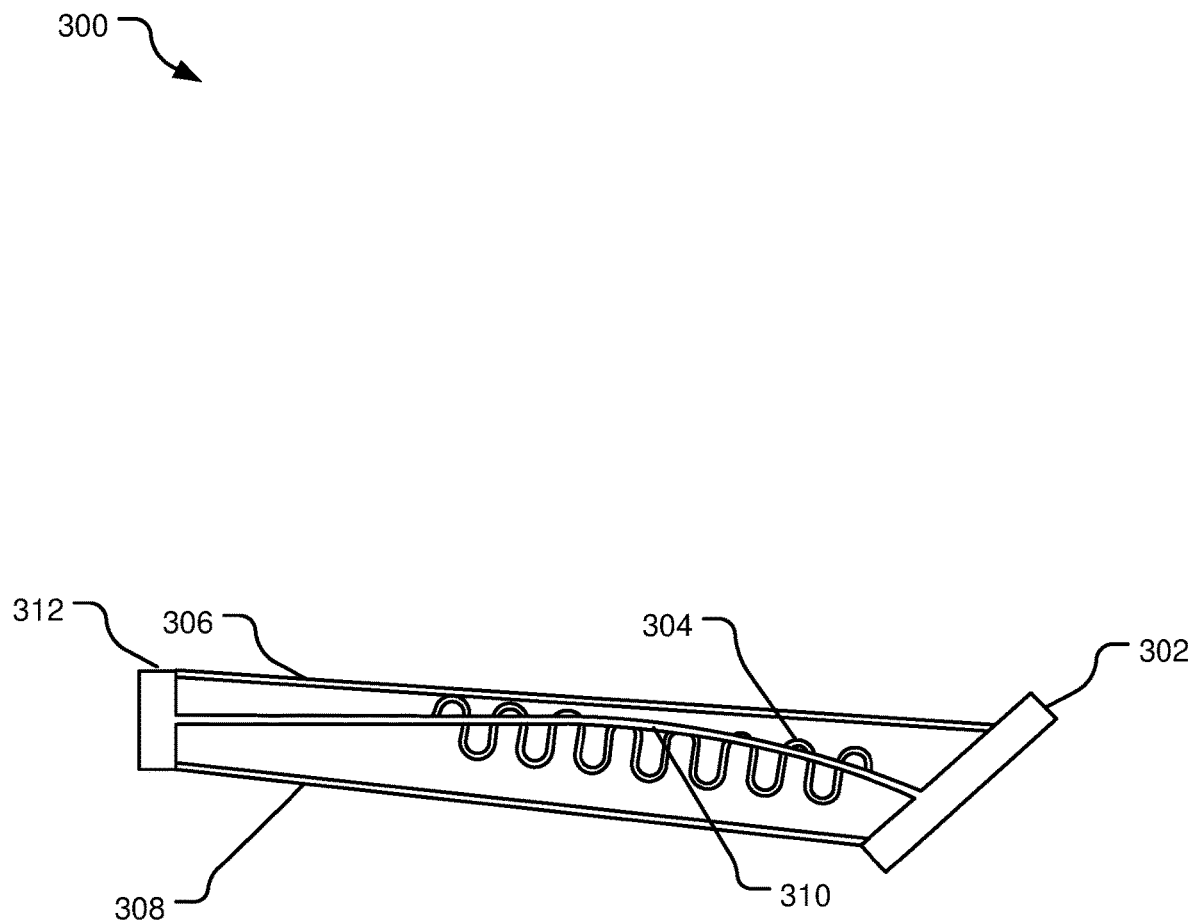
FIG. 3 illustrates an example diagram of an actuator latch in a lower position.

FIG. 3 illustrates an example side view of an actuator latch 300 in a down position. Actuator latch 300 includes pin 302, a spring 304, an upper SMA wire 306, a lower SMA wire 308, a flexure 310, and an anchor 312. One or more of the components 302-312 are substantially similar to the components 102-112 disclosed in FIG. 1 and the components 202-212 disclosed in FIG. 2. Specifically, FIG. 3 illustrates the lower SMA wire 308 to be flexed such that in this position its length is lower than the length of the lower SMA wire 208 as shown in FIG. 2. Similarly, the upper SMA wire 306 to be relaxed such that in this position its length is higher than the length of the lower SMA wire 206 as shown in FIG. 2. The effect of the flexures of the upper SMA wire 306 and the lower SMA wire 308 results in the pin 302 being moved from its position as illustrated by 208.

The upper SMA wire 306 and the lower SMA wire 308 may be flexed as necessary by changing their temperature. In one implementation, the temperatures may be changed by application of electrical current to one or both of the upper SMA wire 306 and the lower SMA wire 308.

Figure 4A:
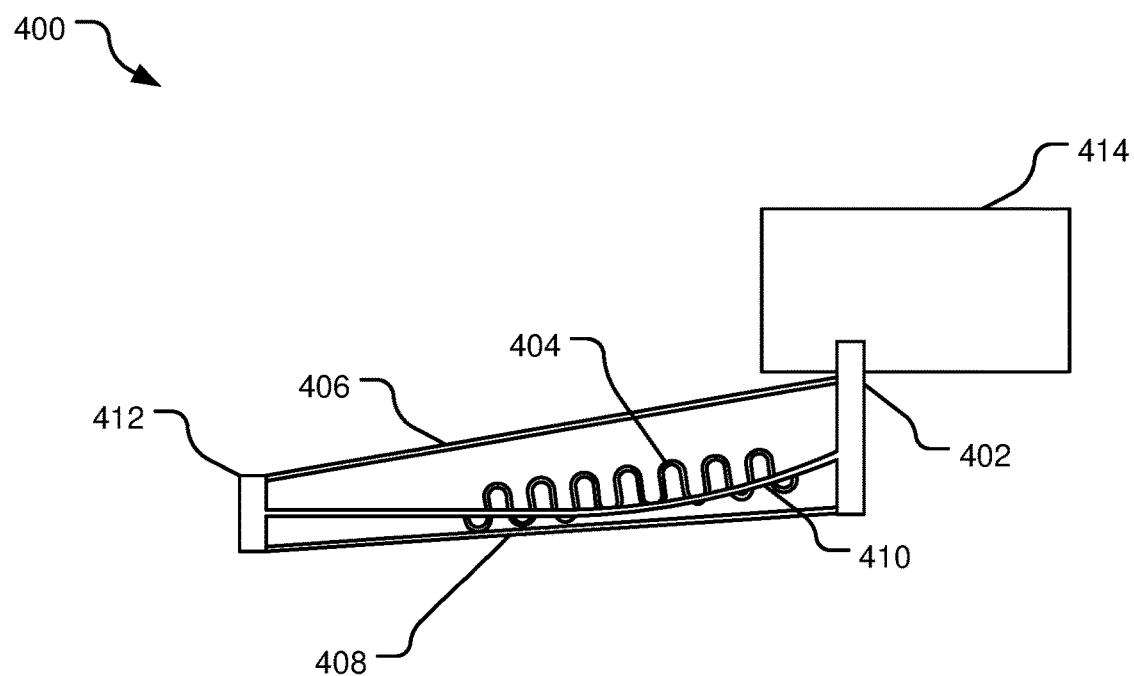
FIGS. 4A and 4B illustrate example diagrams of an actuator latch locking an actuator.
Figure 4B:
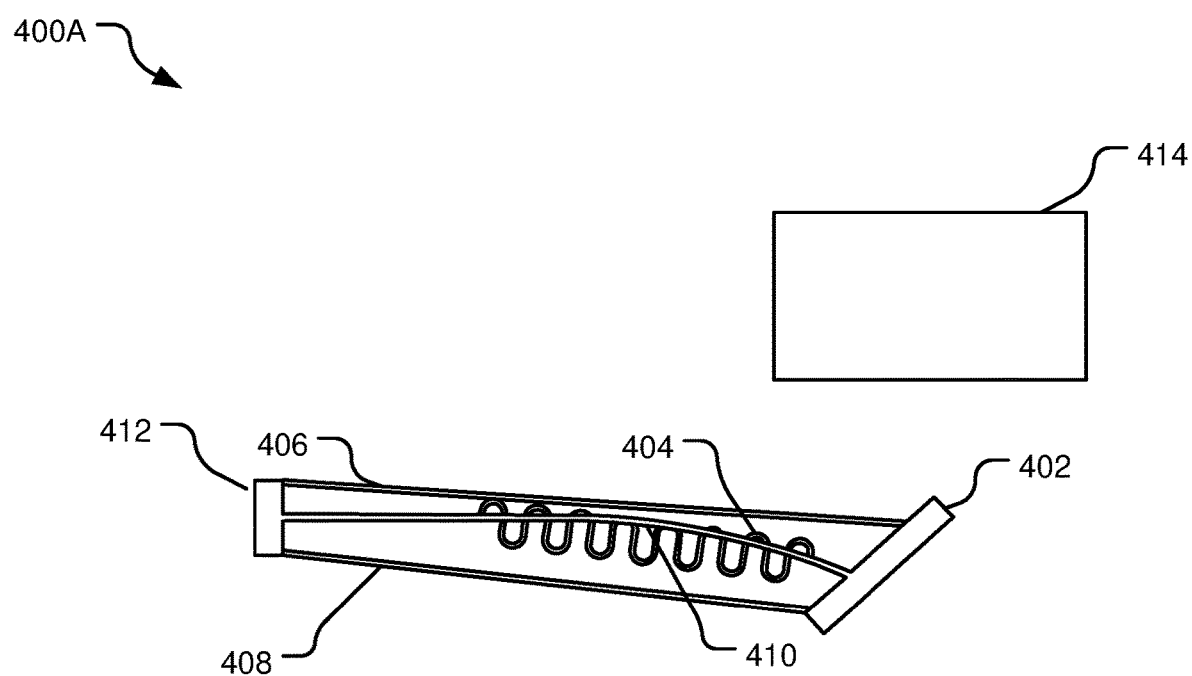

FIGS. 4A and 4B illustrate example diagrams of an actuator latch 400 (400A) locking an actuator 414. Actuator latch 400 includes a pin 402, a spring 404, an upper SMA wire 406, a lower SMA wire 408, a flexure 410, and an anchor 412. Specifically, the actuator latch 400 is in a position where it blocks the actuator 414 whereas at 400A, the actuator latch is retracted, allowing the actuator 414 to move. The actuator latch 400 may be moved to actuator latch 400A by flexing the upper SMA wire 406 and the lower SMA wire 408 by changing their temperature. In one implementation, the temperatures may be changed by application of electrical current to one or both of the upper SMA wire 406 and the lower SMA wire 408.

Figure 5A:
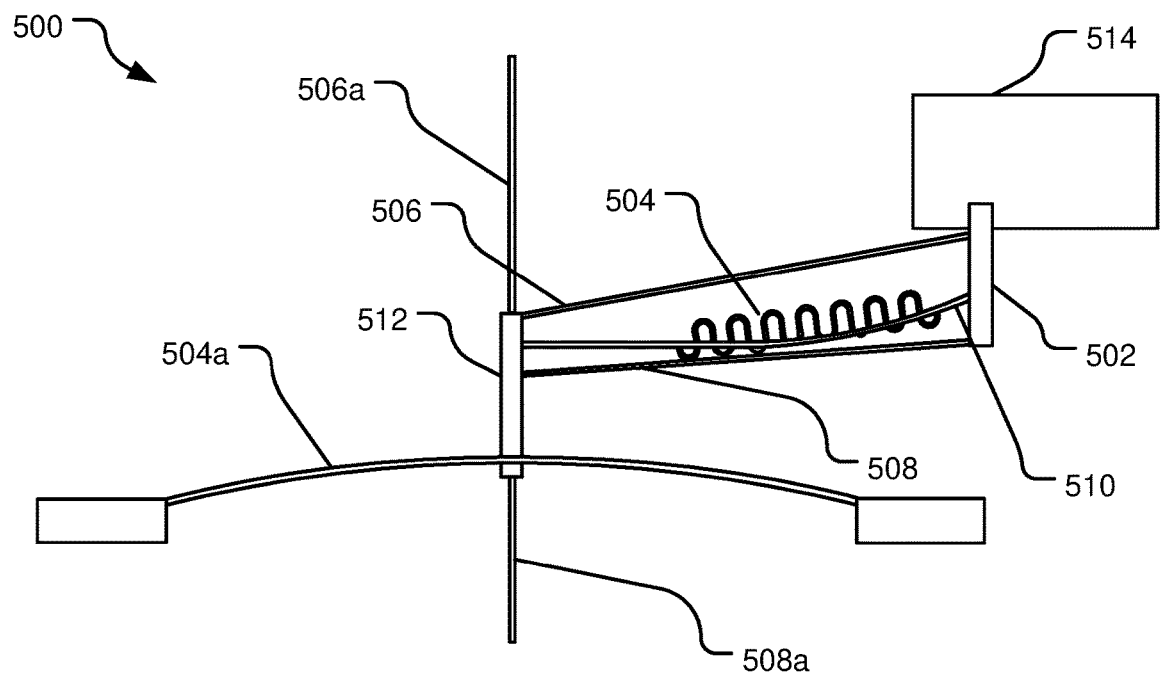
FIGS. 5A and 5B illustrate alternative example diagrams of an actuator latch in various intermediate stages of spring flexure.
Figure 5B:
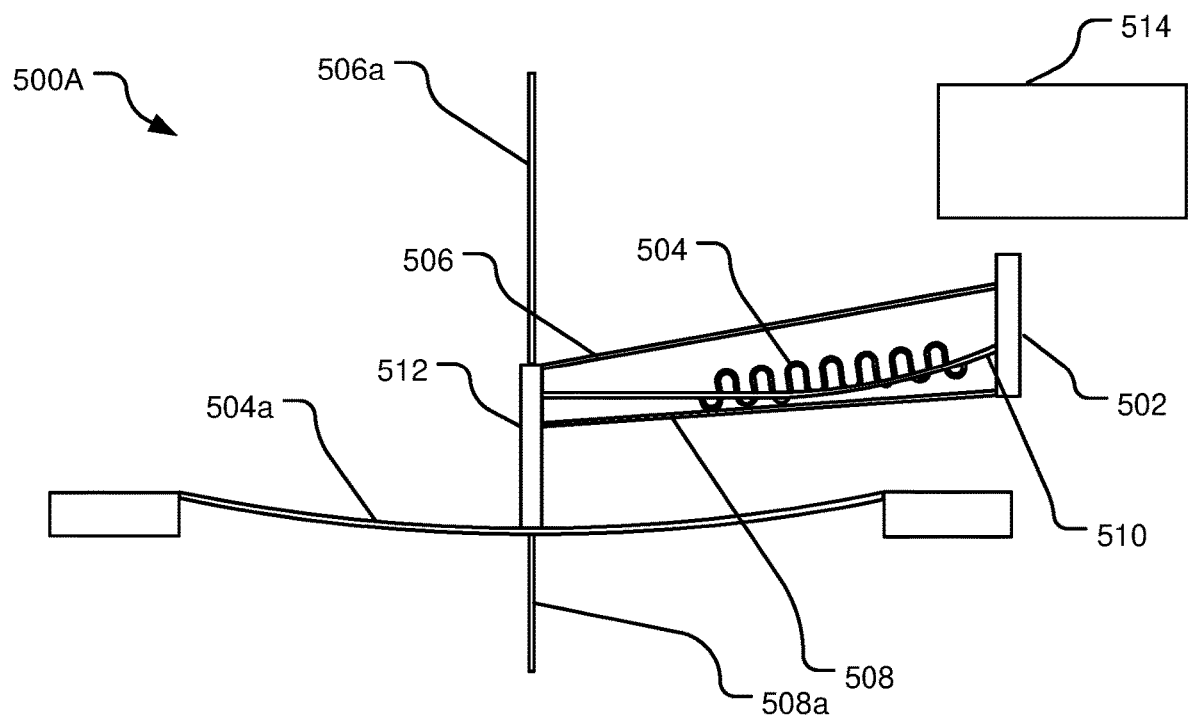

FIGS. 5A and 5B illustrate alternative example diagrams of an actuator latch 500 (500A) in various intermediate stages of spring flexure. Actuator latch 500 includes a pin 502, a spring 504, an upper SMA wire 506, a lower SMA wire 508, a flexure 510, and an anchor 512. One or more components 502-514 are substantially similar to the components 402-414 illustrated in FIG. 4. Specifically, FIGS. 5A and 5B illustrate that different combinations of flexures can be combined to form a multi-stable system that can be stable at a number of different positions and/or angles. In the illustrated implementation, the anchor 512 is attached at one end to an upper SMA wire 506a and to a lower SMA wire 508a at the other end. Furthermore, a lower end of the anchor 512 may also be attached to a spring flexure 504a.

Specifically, in FIG. 5A, the actuator latch 500 is in an up position with the pin 502 attached to an actuator 514. In this position, the spring flexure 504a is extended up towards the actuator 514. On the other hand, FIG. 5B illustrates the actuator latch 500A in a down position where the pin 502 is detached from the actuator 514. In this position, the spring flexure 504a is extended down and away from the actuator 514.

The actuator latch 500 may be moved to actuator latch position 500A by flexing the upper SMA wire 506 and the lower SMA wire 508 by changing their temperature. In one implementation, the temperatures may be changed by application of electrical current to one or both of the upper SMA wire 506 and the lower SMA wire 508.

Figure 6:
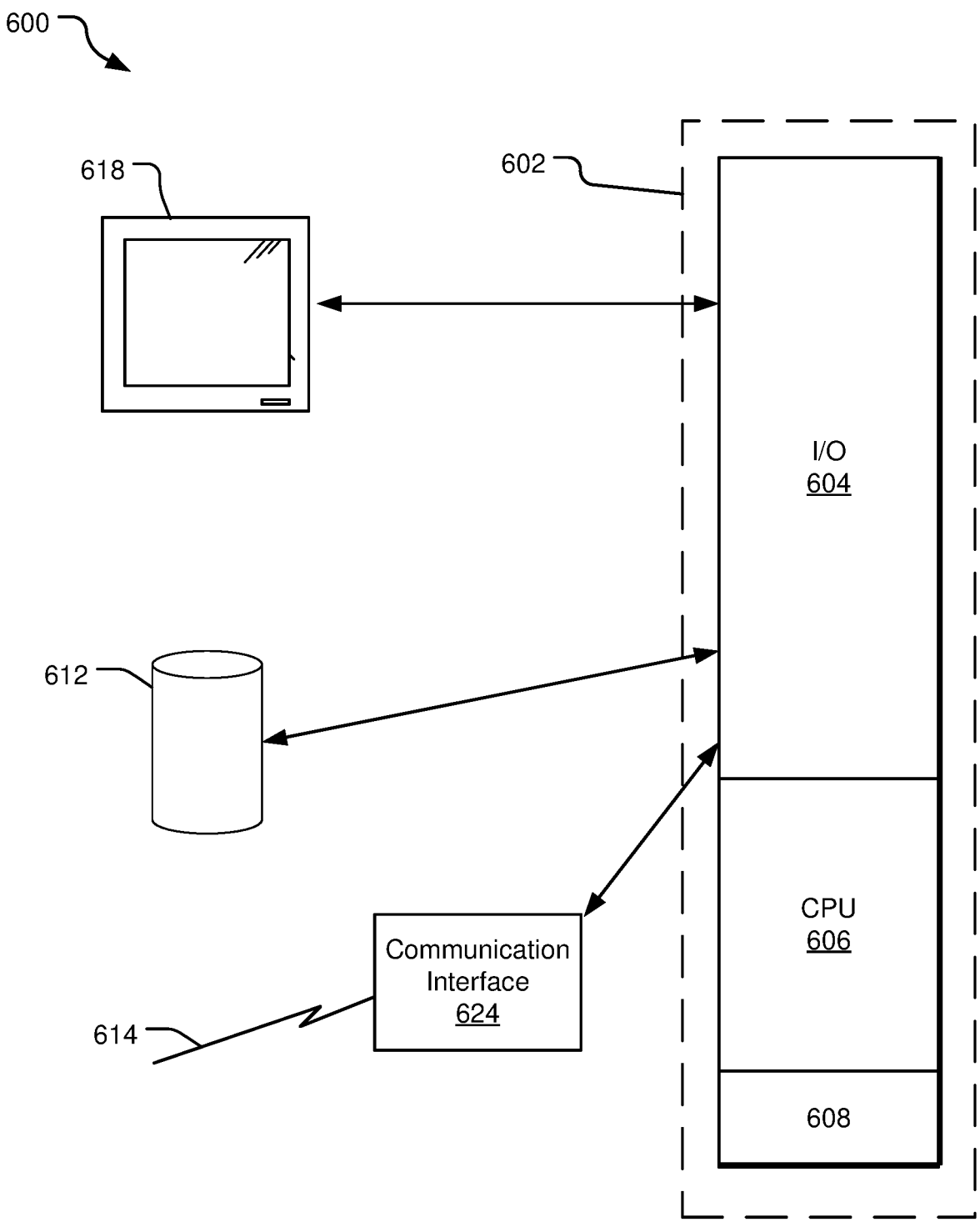
FIG. 6 illustrates an example computing system that may implement the technology described herein.

FIG. 6 illustrates an example processing system 600 that may be useful in implementing the described technology. The processing system 600 is capable of executing a computer program product embodied in a tangible computer-readable storage medium to execute a computer process. Data and program files may be input to the processing system 600, which reads the files and executes the programs therein using one or more processors (e.g., CPUs, GPUs, ASICs). Some of the elements of a processing system 600 are shown in FIG. 6 wherein a processor 602 is shown having an input/output (I/O) section 604, a Central Processing Unit (CPU) 606, and a memory section 608. There may be one or more processors 602, such that the processor 602 of the processing system 600 comprises a single central-processing unit 606, or a plurality of processing units. The processors may be single core or multi-core processors. The processing system 600 may be a conventional computer, a distributed computer, or any other type of computer. The described technology is optionally implemented in software loaded in memory 608, a storage unit 612, and/or communicated via a wired or wireless network link 614 on a carrier signal (e.g., Ethernet, 3G wireless, 5G wireless, LTE (Long Term Evolution)) thereby transforming the processing system 600 in FIG. 6 to a special purpose machine for implementing the described operations. The processing system 600 may be an application specific processing system configured for supporting the disc drive throughput balancing system disclosed herein.

The I/O section 604 may be connected to one or more user-interface devices (e.g., a keyboard, a touch-screen display unit 618, etc.) or a storage unit 612. Computer program products containing mechanisms to effectuate the systems and methods in accordance with the described technology may reside in the memory section 608 or on the storage unit 612 of such a system 600.

A communication interface 624 is capable of connecting the processing system 600 to an enterprise network via the network link 614, through which the computer system can receive instructions and data embodied in a carrier wave. When used in a local area networking (LAN) environment, the processing system 600 is connected (by wired connection or wirelessly) to a local network through the communication interface 624, which is one type of communications device. When used in a wide-area-networking (WAN) environment, the processing system 600 typically includes a modem, a network adapter, or any other type of communications device for establishing communications over the wide area network. In a networked environment, program modules depicted relative to the processing system 600 or portions thereof, may be stored in a remote memory storage device. It is appreciated that the network connections shown are examples of communications devices for and other means of establishing a communications link between the computers may be used.

In an example implementation, a storage controller, and other modules may be embodied by instructions stored in memory 608 and/or the storage unit 612 and executed by the processor 602. Further, the storage controller may be configured to assist in supporting the RAID0 implementation. A RAID storage may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 608 and/or the storage unit 612 and executed by the processor 602.

The processing system 600 may be implemented in a device, such as a user device, storage device, IoT device, a desktop, laptop, computing device. The processing system 600 may be a storage device that executes in a user device or external to a user device.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A device, comprising:
    an upper shape memory alloy (SMA) wire;
    a lower SMA wire;

a flexure having an opening; and a spring configured within the flexure opening, wherein each of the upper SMA wire, the lower SMA wire, and the flexure are attached at one end to an anchor and at another end to a pin.

2. The device of claim 1, wherein the pin is attached to an actuator.

3. The device of claim 1, wherein the pin is attached to an actuator of a disc drive.

4. The device of claim 1, wherein the flexure is made of an SMA.

5. The device of claim 4, wherein the flexure is made of an SMA that is different than the SMA of the upper SMA wire and the lower SMA wire.

6. The device of claim 1, wherein the SMA is an Ni—Ti alloy.

7. The device of claim 1, wherein the pin is made of a rubber.

8. An actuator latch, comprising:

a flexure configured between an upper shape memory alloy (SMA) wire and a lower SMA wire, wherein each of the upper SMA wire and the lower SMA wire are attached at one end to an anchor and at another end to a pin; and wherein the flexure has an opening configured to house a spring.

9. The actuator latch of claim 8, wherein the flexure is attached at one end to the anchor and at another end to the pin.

10. The actuator latch of claim 8, wherein the pin is attached to an actuator in one position and detached from the actuator in another position.

11. The actuator latch of claim 8, wherein the flexure is made of an SMA that is different than the SMA of the upper SMA wire and the lower SMA wire.

12. The actuator latch of claim 8, wherein the SMA is an Ni—Ti alloy.

13. The actuator latch of claim 8, wherein the pin is made of a material having viscoelastic property substantially similar to that of rubber.

14. The actuator latch of claim 8, wherein the anchor is attached to an upper SMA wire at one end and to a lower SMA wire at another end.

15. The actuator latch of claim 8, wherein at least one of the upper SMA wire and the lower SMA wire may be flexed by changing the temperature of the at least one of the upper SMA wire and the lower SMA wire.

16. The actuator latch of claim 15, wherein the temperature of the at least one of the upper SMA wire and the lower SMA wire is changed by passing current through at least one of the upper SMA wire and the lower SMA wire.

17. An apparatus, comprising:

an actuator for a hard disc drive (HDD);

an actuator latch configured to restrict the motion of the actuator, the actuator latch comprising:

a flexure configured between an upper shape memory alloy (SMA) wire and a lower SMA wire, wherein each of the upper SMA wire and the lower SMA wire are attached at one end to an anchor and at another end to a pin; and wherein the flexure has an opening configured to house a spring.

18. The apparatus of claim 17, wherein the flexure is attached at one end to the anchor and at another end to the pin and wherein the pin is attached to the actuator in one position and detached from the actuator in another position.

19. The apparatus of claim 17, wherein the flexure is made of an SMA that is different than the SMA of the upper SMA wire and the lower SMA wire.

20. The apparatus of claim 17, wherein the SMA is an Ni—Ti alloy.

* * * * *